United States Patent [19]
Reichert

[11] Patent Number: 5,931,360
[45] Date of Patent: *Aug. 3, 1999

[54] DETACHABLE MOTORCYCLE PASSENGER SEAT AND/OR LUGGAGE RACK

[76] Inventor: Cory A. Reichert, 208 E. 13800 South, Draper, Utah 84020

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/765,001
[22] PCT Filed: Apr. 18, 1996
[86] PCT No.: PCT/US96/05489
   § 371 Date: Dec. 18, 1996
   § 102(e) Date: Dec. 18, 1996
[87] PCT Pub. No.: WO96/33055
   PCT Pub. Date: Oct. 24, 1996

Related U.S. Application Data

[63] Continuation-in-part of application No. 08/423,772, Apr. 18, 1995, Pat. No. 5,558,260.

[51] Int. Cl.⁶ .................................................. B62J 7/04
[52] U.S. Cl. ........................... 224/413; 224/416; 224/419
[58] Field of Search .................................. 224/413, 415, 224/416, 423, 535, 42.31, 419

[56] References Cited

U.S. PATENT DOCUMENTS

| | | |
|---|---|---|
| 3,746,392 | 7/1973 | German . |
| 3,791,563 | 2/1974 | Raat ........................................ 224/457 |
| 3,795,354 | 3/1974 | Stippich ................................ 224/32 A |
| 4,096,980 | 6/1978 | Clow ..................................... 224/413 X |
| 4,174,796 | 11/1979 | Nakamura ........................... 224/413 X |
| 4,266,703 | 5/1981 | Litz ....................................... 224/32 A |
| 4,440,330 | 4/1984 | Goodman .............................. 224/30 R |
| 4,773,573 | 9/1988 | Doveri .................................. 224/32 A |
| 4,993,731 | 2/1991 | Fuller . |
| 5,322,345 | 6/1994 | Desser .................................... 297/214 |

*Primary Examiner*—Renee S. Luebke
*Attorney, Agent, or Firm*—Mallinckrodt & Mallinckrodt

[57] ABSTRACT

A method of attaching an auxiliary passenger seat, luggage rack, or combination of both, to a motorcycle requires adding short spacers to fender attachment bolts of the motorcycle or adding mounting pins to the motorcycle; providing a seat having a plurality of hooks that mate with the spacers or pins; engaging the hooks of the seat to the spacers or mounting pins; and engaging a latch to prevent the hooks from slipping off of the spacers or pins. The latch is easily unlatched to allow quick removal of the auxiliary passenger seat or luggage rack when desired.

13 Claims, 8 Drawing Sheets

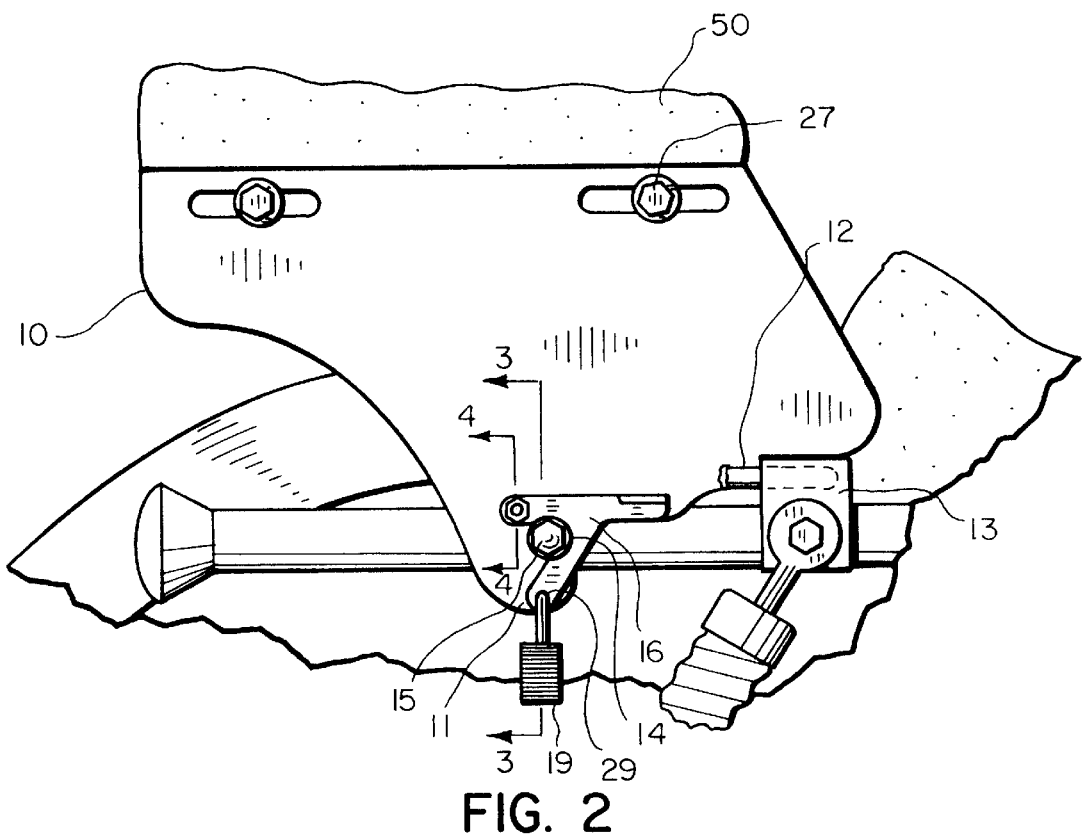
FIG. 2
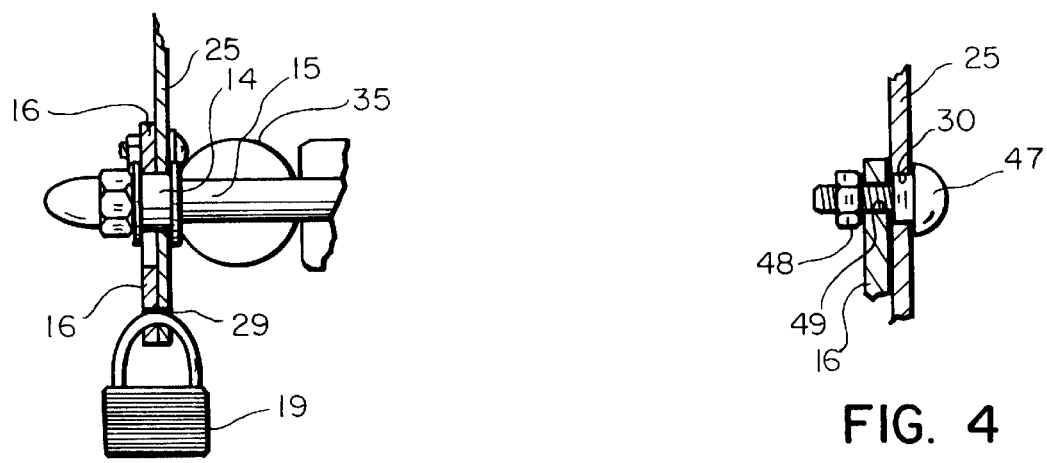
FIG. 3
FIG. 4

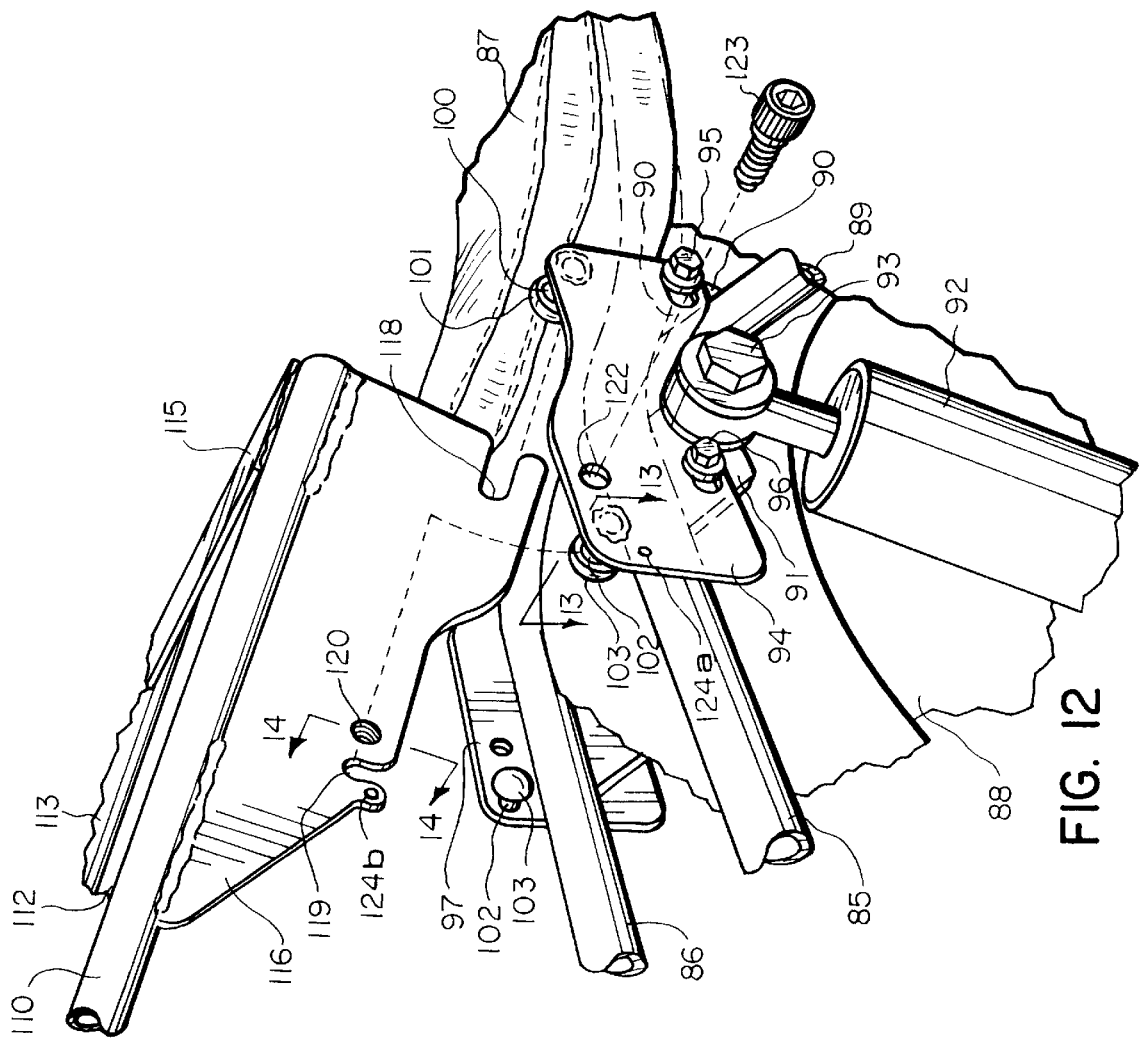
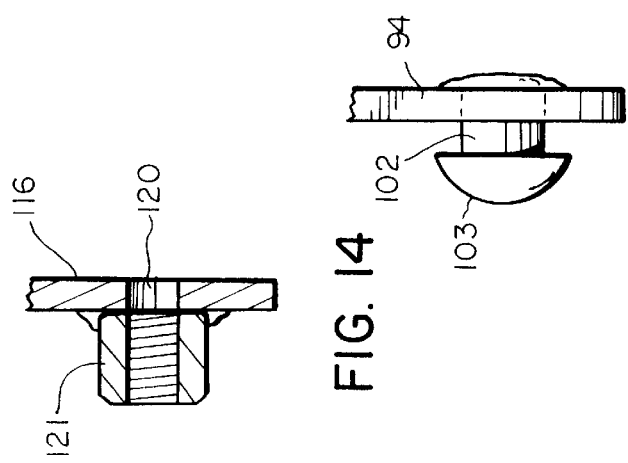
FIG. 12
FIG. 13
FIG. 14

DETACHABLE MOTORCYCLE PASSENGER SEAT AND/OR LUGGAGE RACK

RELATED APPLICATIONS

This application is the national U.S. phase filing under 35 USC 371 of PCT application No. PCT/US96/05489 which was filed on Apr. 18, 1996 as a continuation-in-part of application Ser. No. 423,772 filed Apr. 18, 1995, now U.S. Pat. No. 5,558,260 issued Sep. 24, 1996.

BACKGROUND OF THE INVENTION

1. Field

The invention relates to the field of detachable motorcycle passenger seats and luggage racks.

2. State of the Art

Owners of motorcycles require that their vehicle be versatile. At times, they may wish to carry passengers, at other or at the same times they may need to carry groceries, luggage, or other cargo, and at other times they may wish to restore their vehicle to an appearance as similar as possible to the appearance of the vehicle as it left the factory. There is a market, therefore, for passenger seats and/or luggage racks that may be readily removed from and reattached to the vehicle. Owners of classic motorcycles further require that the seat or luggage rack attach without damage to the motorcycle, such as would be required were it necessary to drill additional holes in any of the motorcycle components.

It would be advantageous for owners of such motorcycles if removal of an auxiliary passenger seat and/or luggage rack, or exchange of a seat for a luggage rack or vice versa, were quick, easy, and accomplished without tools. Further, it would be desirable if the seat and/or luggage rack were attached to the motorcycle so that a thief would require tools to remove such from the motorcycle.

A removable auxiliary passenger seat for motorcycles is shown by U.S. Pat. No. 5,322,345, issued to Desser, et al., in Jun. 21, 1994. The seat of Desser attaches to the rear fender of the motorcycle by way of several large suction cups. This seat may be subject to theft because there is no way of locking it to the motorcycle.

An auxiliary child's seat is shown by U.S. Pat. No. 3,746,392, issued to Lorrayne German on Jul. 17 of 1973. This seat attaches to an open work metal luggage carrier by way of straps and seat material that deforms into the gaps of the luggage carrier under the occupant's weight.

SUMMARY OF THE INVENTION

The present invention comprises a removable motorcycle attachment base for a passenger seat, luggage rack, or both, that utilizes a pair of hooks with a pair of latches to removably secure each side of the attachment base to spacers and bolts installed in existing bolt holes in the vehicle. The base may further attach to the vehicle at additional points by means of a pair of pins and sockets, the sockets being attached to the vehicle by means of existing bolts for some models of motorcycles. This base is particularly adapted for installation on HARLEY DAVIDSON motorcycle models having an outside shock absorber.

An alternate embodiment of the present invention intended to be attached to other models of motorcycles incorporates the same spacers, hooks, and latches as does the presently preferred embodiment, but does not incorporate pins and sockets. This base is further secured to the motorcycle by way of a pair of additional hooks mating to additional spacers, and is particularly adapted for installation on Harley Davidson "soft tail" motorcycles having an internal shock absorber.

To ensure secure attachment to the vehicle, the latches are held closed, thereby securing the seat in position, through use of a bolt and wing nut, or alternatively by way of a padlock. The seat may be removed from the motorcycle by removing the wing nut and bolt, or by removing the padlock, opening the latches, and sliding the seat off the motorcycle.

In a further embodiment of the invention, mounting plates are secured to the motorcycle which provide the spacer in the form of headed pins extending from the mounting plates for mounting of the attachment base, again through hook portions in the sides of the attachment base which fit on the pins. This arrangement is particularly useful for the HARLEY DAVIDSON FLH Model.

One embodiment of seat and luggage rack provides a sliding support that can be a back rest for the rider, a passenger, or can hold luggage, depending upon its position on the rack. An auxiliary seat cushion can provide a passenger seat or a backrest for the driver.

While the presently preferred embodiment of the invention is designed to be attached to several models of HARLEY DAVIDSON motorcycles, future embodiments may be adaptable to attachment to motorcycles of other makes and models.

THE DRAWINGS

The best mode presently contemplated for carrying out the invention is illustrated in the accompanying drawings, in which:

FIG. 1 is a perspective view of the presently preferred embodiment incorporating two latches with hooks and two pins, showing the manner in which the base attaches to a motorcycle;

FIG. 2, a right side view of the presently preferred embodiment incorporating pins shown mounted to a vehicle;

FIG. 3, a fragmentary cross sectional view of the latch, bolt, and spacer taken at 3—3 of FIG. 2;

FIG. 4, a fragmentary cross sectional view of the mounting of the latch taken at 4—4 of FIG. 2;

FIG. 5, a right side view of the alternate embodiment of the present invention required for motorcycles having no external shock absorber and spring assemblies;

FIG. 6, a perspective view of the presently preferred embodiment showing an attached small luggage rack;

FIG. 7, a perspective view of the presently preferred embodiment utilized as a luggage rack;

FIG. 8, a fragmentary horizontal right side view of an alternative embodiment of the latch and securing device;

FIG. 9, a fragmentary perspective view showing use of a pin and spring clip as a securing device;

FIG. 10, a fragmentary horizontal right side view of an alternative embodiment of the latch and securing device;

FIG. 11, a fragmentary horizontal right side view of an alternative embodiment wherein the function of the latch and securing device of the presently preferred embodiment is performed by a spring clip inserted in a hole drilled through the pin and socket that secures the base to the motorcycle;

FIG. 12, a fragmentary perspective view of the portion of a motorcycle behind the seat showing a further alternative mounting system of the invention;

FIG. 13, a fragmentary top plan view of a mounting pin taken on the line 13—13 of FIG. 12;

FIG. 14, a fragmentary vertical section taken on the line 14—14 of FIG. 12;

FIG. 15, a perspective view of an alternate seat and luggage rack of the invention;

FIG. 16, a vertical section taken on the line 16—16 of FIG. 15;

FIG. 17, a fragmentary vertical section taken on the line 17—17 of FIG. 16;

FIG. 18, a side elevation of the seat and luggage rack of FIG. 15; and

FIG. 19, a side elevation similar to FIG. 18, but showing the seat cushion used as a backrest.

DETAILED DESCRIPTION OF THE ILLUSTRATED EMBODIMENTS

Figure 1:
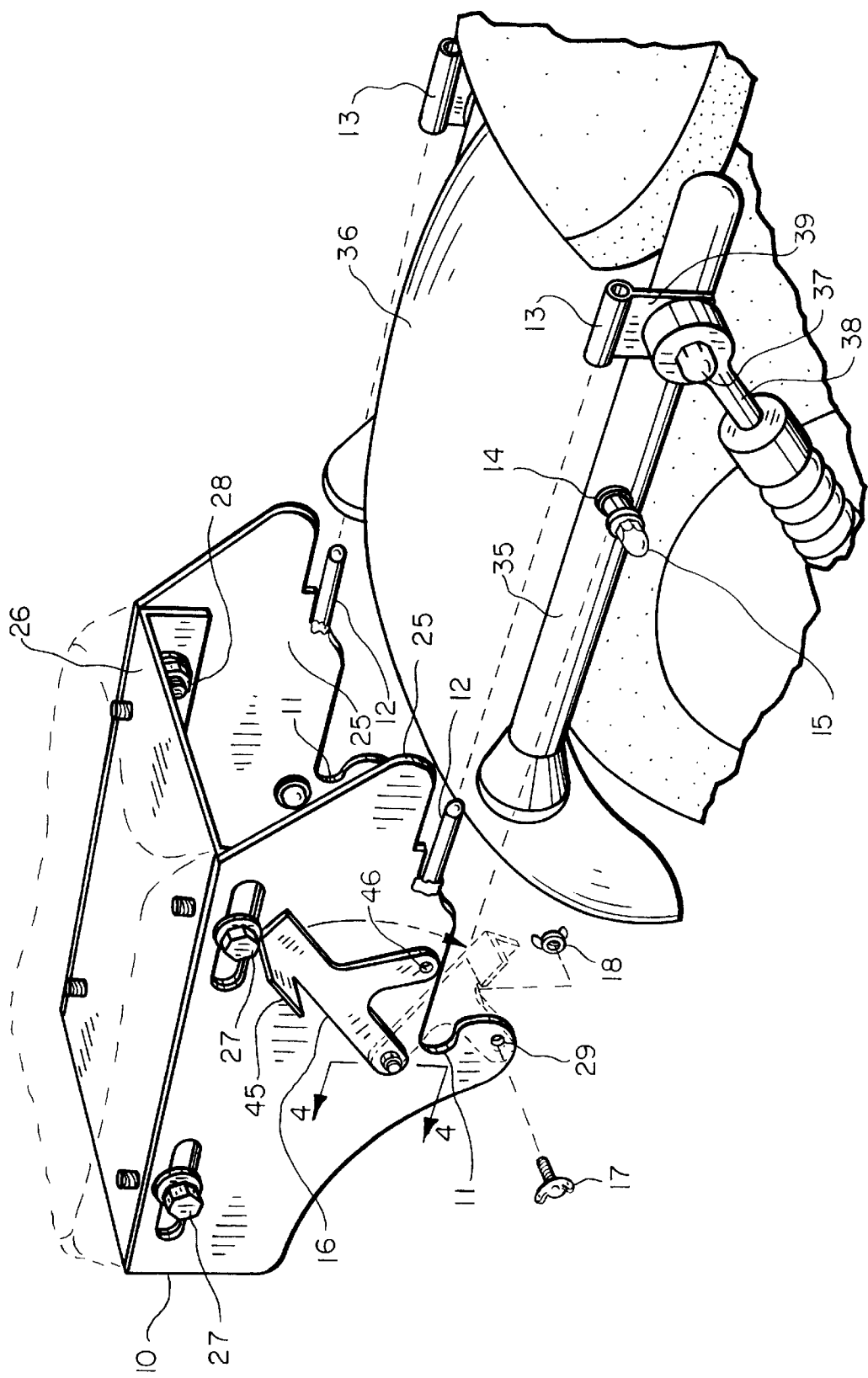

The present invention incorporates a seat or luggage rack supporting structure 10 having a plurality of hook portions 11 and a plurality of pins 12. The seat is attached to a motorcycle by inserting the pins 12 of the supporting structure into sockets 13 that are attached to the motorcycle, while engaging the hook portions 11 around spacers 14 fitted over bolts 15 that are attached to the motorcycle. Latch 16 is engaged about spacers 14 to prevent the base from sliding off the motorcycle while it is in use, the latches may be secured in place by way of a wing bolt 17 and wing nut 18 (FIG. 1), or by way of a padlock 19 (FIG. 2).

The supporting structure 10 of the base is preferably fabricated from one eighth inch sheet steel. The presently preferred embodiment is constructed of two side plates 25 and a top plate 26. The side plates 25 are attached to the top plate 26 by means of a plurality of bolts 27 and nuts 28. The side plates 25 and top plate 26 may be fabricated with lightening holes (not shown) so long as adequate material remains for strength. A pin of five sixteenths inch diameter steel 12 is attached to each side plate 25 of supporting structure 10, preferably by welding them to the side plates 25. Each side plate is fabricated with a hook section 11 having an opening sufficiently wide to engage a half inch diameter spacer 14, and has a hole 29 for a securing device and a hole 30 (FIG. 4) for attaching a latch 16.

The motorcycle is modified to permit attachment of the base by removing an existing bolt, normally used to mount the fender 36 to the motorcycle, which passes through a frame member of the motorcycle 35, and reinstalling a longer bolt 15 with a three-eights inch long spacer 14 surrounding the bolt 15. The motorcycle is further modified by removing a bolt 37 that attaches a spring and shock absorber assembly 38 to the frame of the motorcycle 35. This bolt 36 and shock absorber assembly 37 are reassembled to the frame 35 such that the bolt also passes through a mounting plate 39 for a socket 13. The mounting plate 39 is made of one eighth inch sheet steel, welded to the socket 13 comprising steel tubing of three eighths inch inner diameter and one half inch outer diameter. These modifications are performed to each side of the vehicle, such that two spacers and two sockets are added to the vehicle.

The latch 16 is also formed of one-eighth inch sheet steel. The latch is formed with a thumb flange 45 and a securing hole 46. The latch is pivotally attached to the supporting structure 10 by way of bolt 47 and self-locking nut 48, such that the bolt 47 passes through a hole 49 in the latch and hole 30 in the side plate 25 of supporting structure 10. It is important that the latch be secured in such a manner that the base will not come loose from the motorcycle under the vibration and jolting of normal operation. The latch is secured about the spacer 14 through use of a wing nut 18 and wing bolt 17 (FIG. 1) or alternatively, a padlock 19 (FIGS. 2 and 3). A cushion 50 is attached to the top of the supporting structure.

The base may be readily removed from the motorcycle by unscrewing the wing nut 18, and removing the wing bolt 17, or unlocking and removing the lock 19. The base may then be slid backwards until the hook portions 11 of the supporting structure 10 disengage from spacers 14 and the pins 12 disengage from the sockets 13, at which point it may be lifted off the motorcycle.

Figure 5:
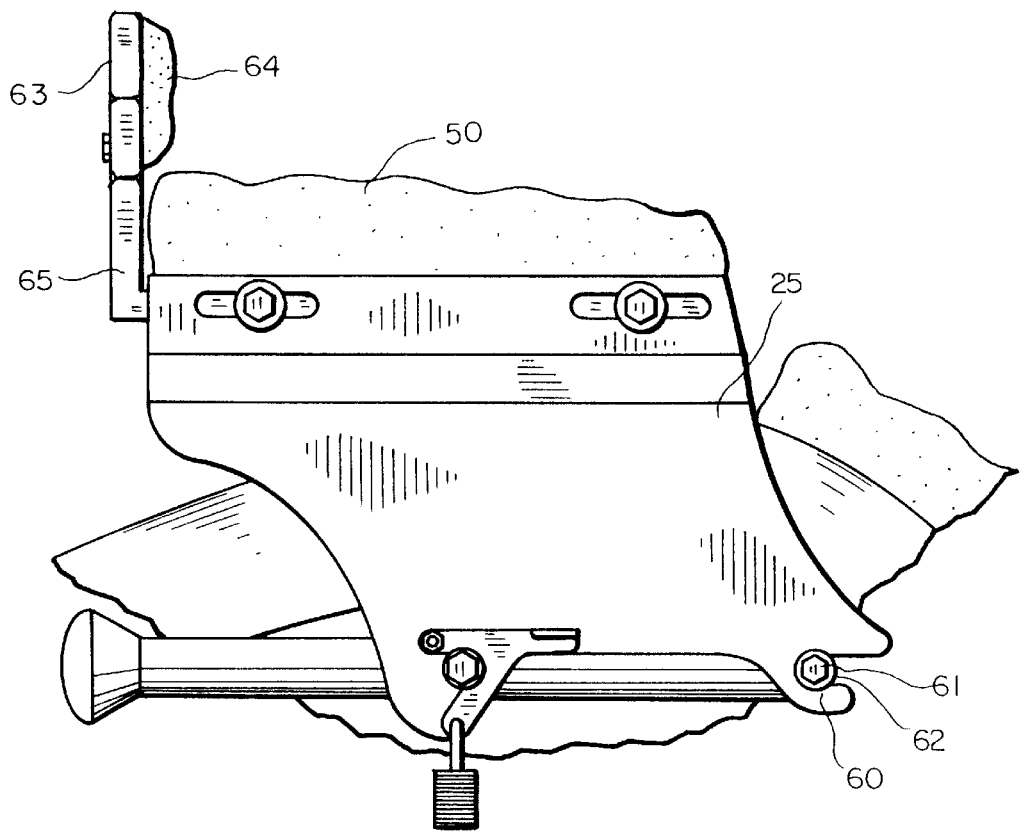

In an alternative embodiment of the present invention, as illustrated in FIG. 5, and as intended for use on those motorcycles lacking an external spring and shock absorber assembly 38, no sockets 13 nor pins 12 are used. The supporting structure 10 is mounted to the motorcycle by fabricating an additional hook portion 60 in each side plate 25, and modifying an additional fender attachment bolt on each side of the vehicle with an additional spacer 62. With this embodiment, a total of four spacers are added to the motorcycle.

The base may be readily removed from the motorcycle by unscrewing the wing nut 18, and removing the wing bolt 17, or unlocking and removing the lock 19. The base may then be slid backwards until the hook portions 11 of the supporting structure 10 disengage from spacers 14 and the additional hook portions 60 disengage from the additional spacers 62, at which point it may be lifted off the motorcycle.

Figure 6:
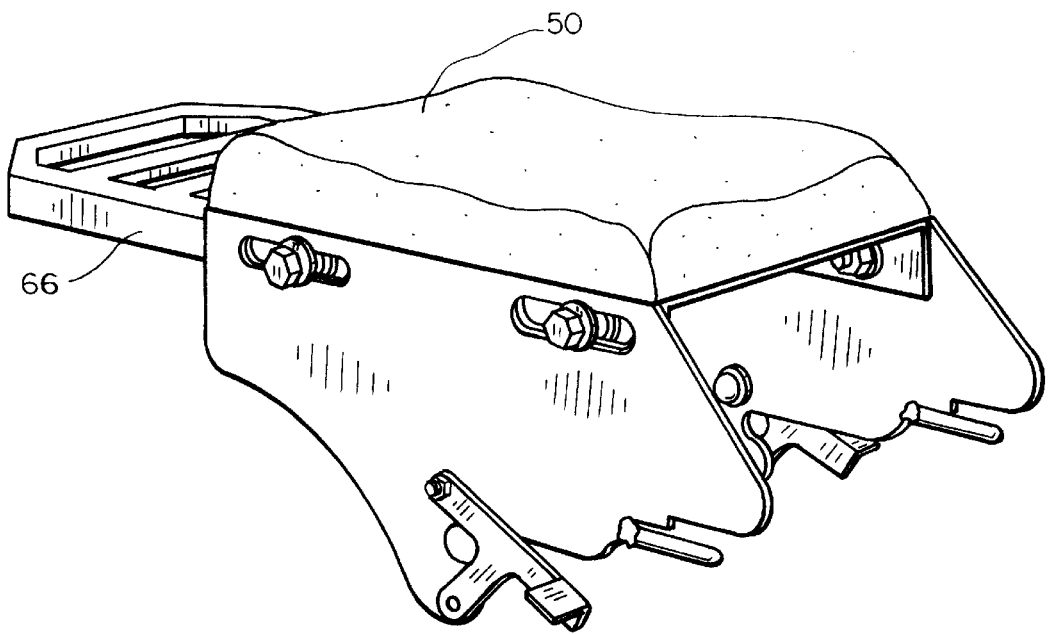
Figure 7:
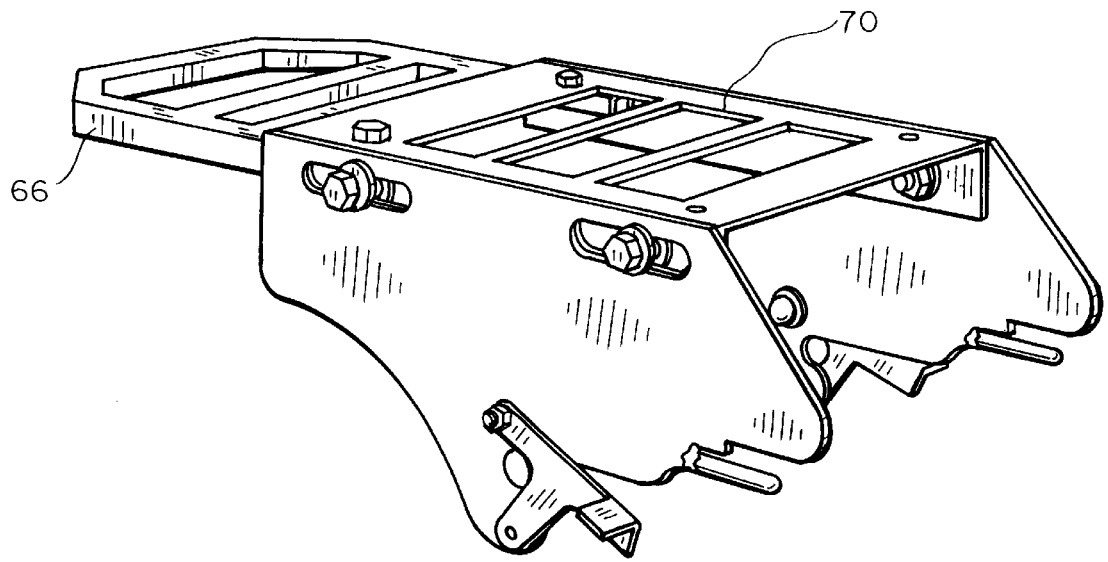

The base may function as a seat when a seating pad is attached to the top of the base. When used as a seat, the seat may further be fitted with a backrest 63 comprising a pad 64 attached to a mounting bracket 65 that is in turn bolted to the supporting structure 10. When used as a seat, the base may also have a small luggage rack extension 66 (FIG. 6) extending behind the seating pad 50, or the seating pad 50 may be left off such that the supporting structure 10, together with any luggage rack extension 66, comprises a luggage rack (FIG. 7). The lightening holes 70 in the top plate of the supporting structure and lightening holes (not shown) in the side plates of the supporting structure may serve for tying luggage to the rack, or panniers (not shown) may be fitted over or attached to the supporting structure.

Nothing in this application is intended to limit the scope of the present invention to the specific embodiment of the present invention illustrated. For example, an alternative embodiment of the present invention may incorporate a pin rotated at ninety degrees to the horizontal. In such an alternative embodiment, the base would be attached to the motorcycle by first engaging the hooks with spacers, then rotating the base upon the hooks until the pins engage in the sockets.

Similarly, in an alternate preferred embodiment, wing bolt 17 may be replaced by a carriage bolt that inserts in a square opening. The square base of the carriage bolt will keep it from rotating when the motorcycle owner twists the wing nut 18 to loosen the nut. Further, the base supporting structure 10 may be constructed from a single piece of metal instead of the illustrated construction of two side plates 25 and a top piece 26 bolted together.

Figure 9:
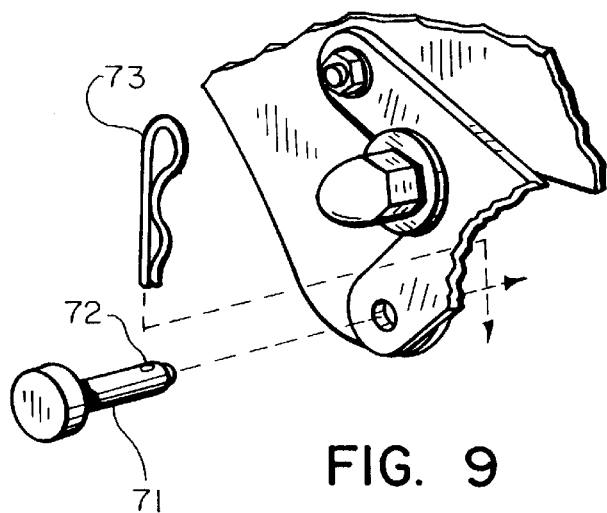

The securing device for the latch 16 may take a number of forms besides those illustrated. In one alternative preferred embodiment (FIG. 9), the securing device takes the form of a pin 71 having a hole 72 near its tip, similar in shape to a clevis pin as used on farm equipment. A spring clip 73 snaps into the hole at the tip of the pin to hold the pin 71 in place. The pin 71 will then secure the latch. A spring-loaded catch (not shown) may also be used to retain the latch in position.

Figure 11:
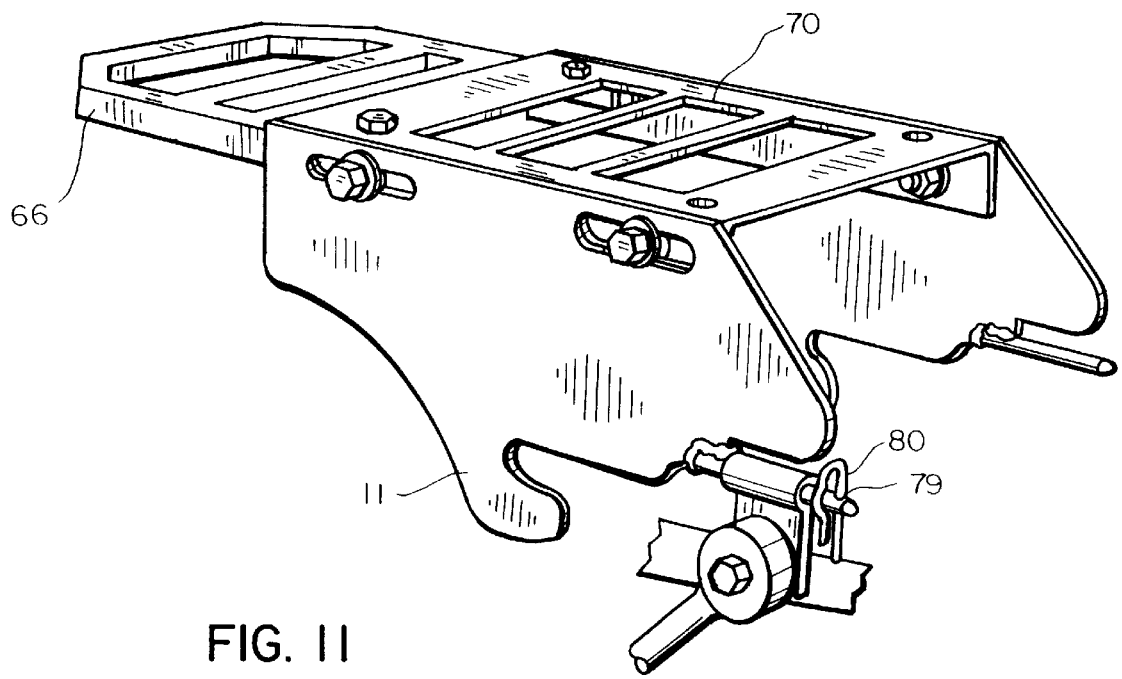
Figure 8:
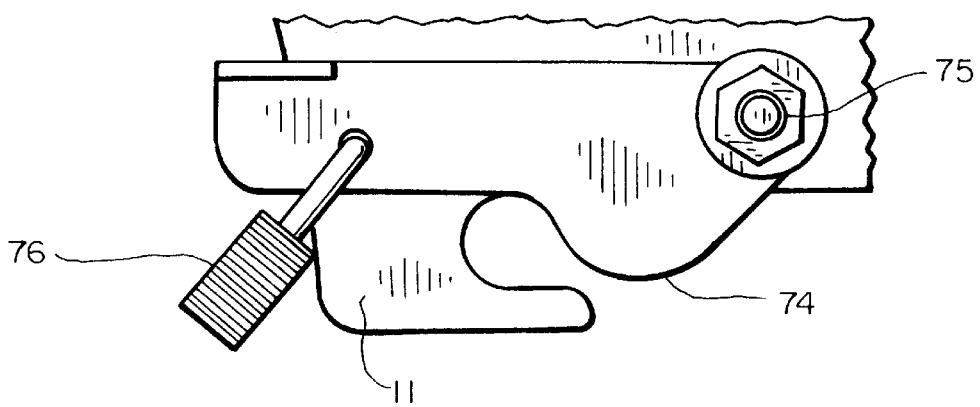
Figure 10:
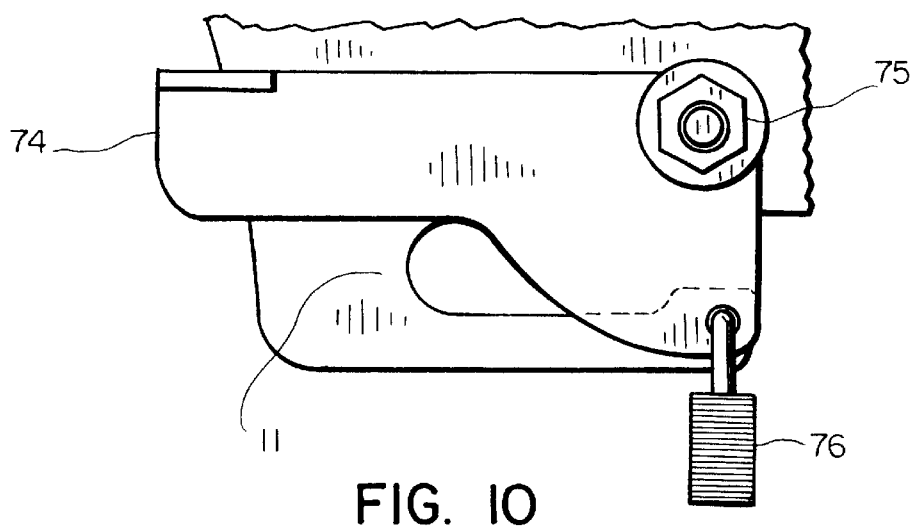

The latch may take a number of variant forms. FIG. 8 shows an alternative latch 74 having a pivot 75 located forward of the hook portion 11 that supports the supporting structure 10. While this may appear sufficient to hold the base in place, it has been found that the latch 74 may work loose under vibration if it is not retained in place by a securing device, such as padlock 76, as is required with the latch of the presently preferred embodiment. Another possible arrangement of the securing device is shown in FIG. 10. Yet another possible method for securing the supporting structure 10 to the motorcycle is shown in FIG. 11, wherein the pins 12 have holes 79 drilled to receive spring clips 80. The spring clips 80 serve to retain the pins 12 in sockets 13 and prevent the base from sliding off of the motorcycle. If the pins 12 and holes 79 are of sufficiently large diameter, a padlock may also be used to retain the pins 12 in sockets 13 and thereby retain the base on the motorcycle.

The pivotable attachment of the latch 16 to the base supporting structure 10 need not be by means of the bolt and nut shown; a heavy duty rivet with a spacer may also serve to form a pivotable attachment. If the bolt 47 is drilled, the self-locking nut 48 may be replaced by either a castle nut over an ordinary nut, or a nut having a hole, and the nut secured in position by a cotter pin (not shown). Similarly, it may be possible to fabricate the supporting structure top portion 26 with a luggage rack extension 66 as one piece.

Another embodiment of the present invention may utilize a second bolt 61 and spacer 62 (FIG. 5) inserted in a hole in the frame of the motorcycle other than a hole for a preexisting fender attachment bolt. The side plates 25 must be suitably shaped to reach the bolt 61 position.

The spacers inserted over the bolts in the present invention may be replaced by a single component having a head of large diameter, a spacer section of intermediate diameter, and a threaded section of lesser diameter.

For some models of motorcycles, such as the HARLEY DAVIDSON FLH Model, it is difficult to use existing holes to mount spacers or sockets for attachment of the supporting structure of the prior embodiments. For satisfactory securement of the supporting structure, it is necessary to provide spacer attachment bolts at a location above the frame member of the motorcycle. The rear frame portion of a motorcycle such as the HARLEY DAVIDSON FLH Model is shown fragmentarily in FIG. 12. Upper side frame members 85 and 86 extend from under seat 87 and around fender 88. Frame member 89 extends from upper frame member 85 downwardly to the motor mount (not shown). A similar member extends downwardly from upper frame member 86 on the opposite side of the motorcycle, but is not visible in FIG. 12. A steel reinforcing plate 90 is welded between frame members 85 and 89 forwardly of frame member 89 and a steel reinforcing plate 91 is welded between frame members 85 and 89 rearwardly of frame member 89. Plate 90 has a single hole therethrough normally used for mounting saddle bags while plate 91 normally has two holes therethrough. The forward hole in plate 91 is used to mount spring and shock absorber assembly 92 with a bolt 93 and the rear hole is normally used to mount a chrome frame cover piece. Similar reinforcing plates are provided on the opposite side of the motorcycle frame.

With an arrangement as described above, a mounting plate or bracket of the invention can be secured to the motorcycle for easy mounting of the seat or luggage rack of the invention thereto. Thus, a mounting plate 94 is secured to one side of the motorcycle by bolt 95 passing through mounting plate 94 and through the normally provided hole in reinforcing plate 90, and by bolt 96 passing through mounting plate 94 and the normally provided rear hole in reinforcing plate 91. Mounting plate 94 is configured to extend around the mounting end of shock absorber assembly 92. However, depending upon the particular motorcycle used, the mounting plate could be held in place by the shock absorber mounting bolt 93, or bolts through other holes provided in frame members or reinforcing plates or through holes drilled by a user in the frame members, reinforcing plates, or other suitable locations. A similar mounting plate 97 is secured in the same manner on the opposite side of the frame. Mounting plates 94 and 97 extend upwardly with their upper edges above frame member 85 and have inwardly projecting headed mounting pins which form and are equivalent to the spacers shown for earlier embodiments. Thus, each mounting plate has a forward pin 100 with head 101 extending from the forward portion of the mounting plate and a rear pin 102 with head 103 extending from the rearward portion of the mounting plate. These pins may be welded to the mounting plates or otherwise secured thereto. Also, while the pins are shown extending inwardly from the mounting plates, they could extend outwardly therefrom. In addition, while the pins are shown with enlarged heads, since the seat and luggage rack base is generally of rigid construction, the heads on the pins are not generally necessary.

The mounting plates with pins 100 and 102 extending therefrom provide a similar mounting scheme for a seat or luggage rack supporting structure as shown for the two spacers of FIG. 5, and the pins could be spaced to accept the seat supporting structure as shown in FIG. 5.

Figure 15:
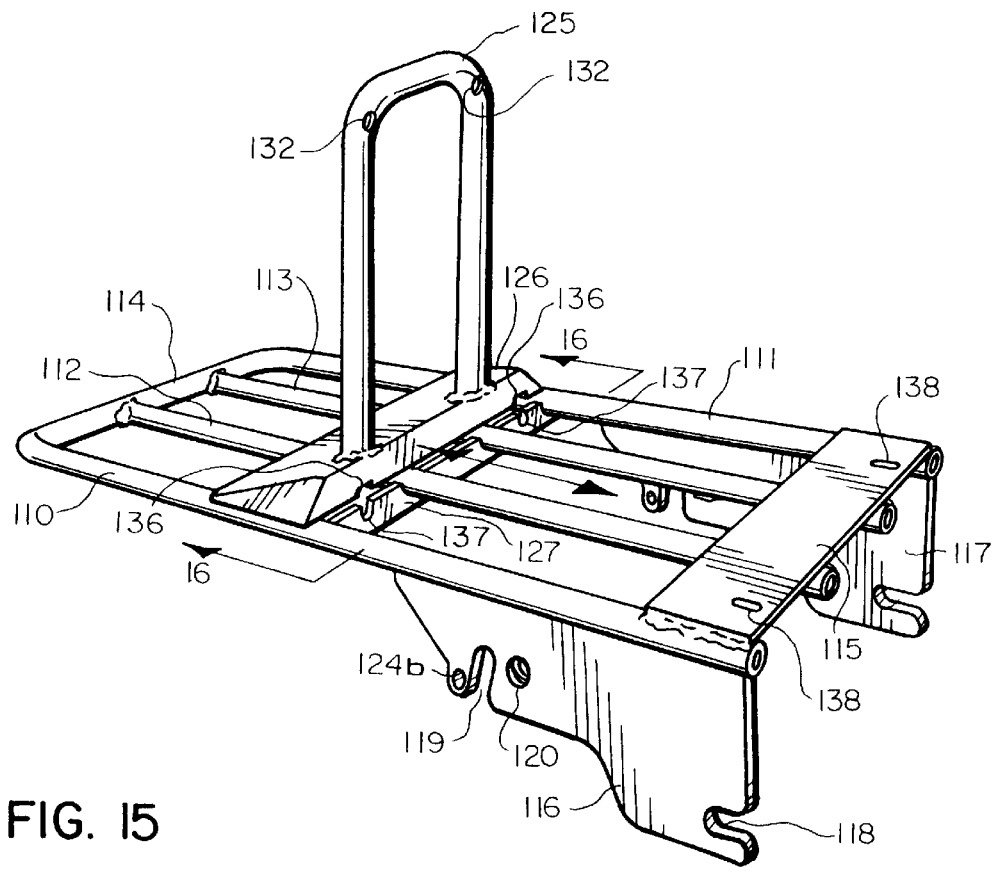
Figure 16:
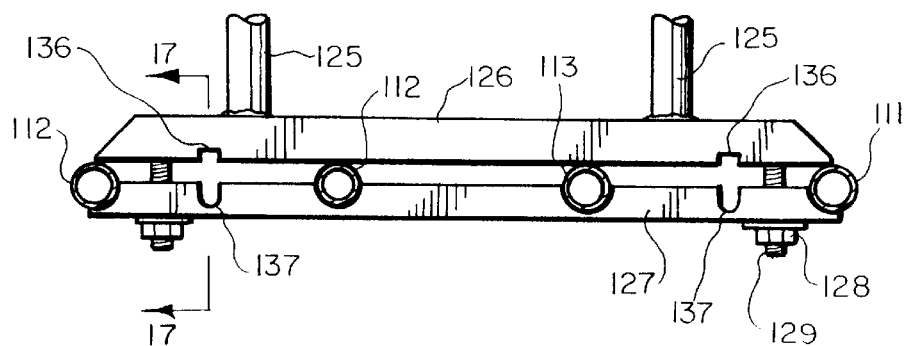
Figure 17:
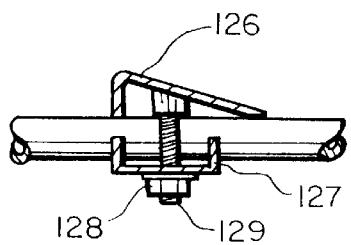

An alternate embodiment of seat and luggage rack is shown in FIGS. 12 and 14–19. The seat and luggage rack include side rails 110 and 111, intermediate longitudinal rails 112 and 113 parallel to and spaced between side rails 110 and 111, end rail 114, and a forward plate member 115. The side and end rails may be formed of a single piece of tubing bent into a U shape, as shown in FIG. 15. Side plates 116 and 117 extend downwardly from side rails 110 and 111 and include hook portions 118 and 119 for engaging pins 100 and 102, respectively. Referring to FIG. 12, in mounting the seat and luggage rack assembly, it is tilted forwardly as shown in FIG. 12 so that hook portions 118 are inserted over pins 100. The seat and luggage rack assembly is then rotated rearwardly about pins 100 so that hook portions 119 extend around pins 102. A hole 120, either internally threaded or provided with threads by means of an aligned nut 121 welded behind hole 120 as shown in FIG. 14, is aligned with mounting plate hole 122. A screw 123 passed through mounting plate hole 122 and tightened into nut 121 will secure the seat and luggage rack assembly in position on the motorcycle. This screw 123 provides a latch to hold the seat and luggage rack assembly from slipping off the mounting pins. A lock, if desired, can be passed through aligned holes 124a and 124b through mounting plate 94 and side plate 116, respectively. Mounting plate 97 and side plate 117 (not shown in FIG. 12) are similar. However, while a similar hole 122 is provided in mounting plate 97 to align with a similar hole 120 in side plate 117, it is not necessary to provide a screw 123 in both sides to latch the seat and luggage rack assembly in place.

Figure 18:
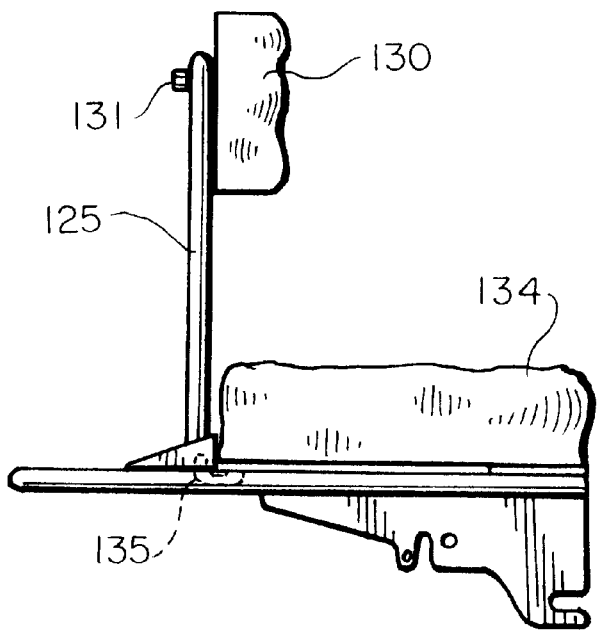
Figure 19:
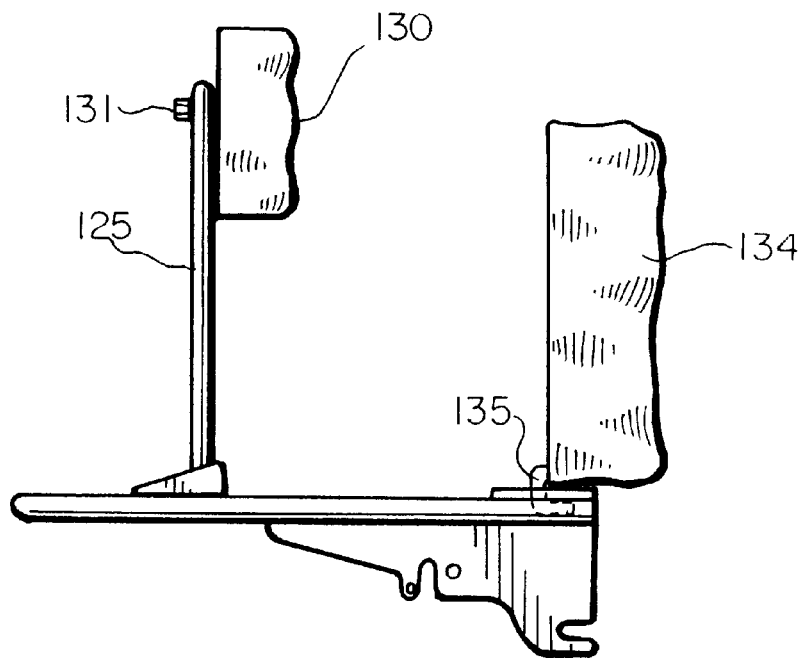

With the seat or luggage rack construction of FIGS. 15–19, a vertically extending support 125 is mounted on upper cross bar 126 which can slide along the tops of rails 110, 111, 112, and 113. Upper cross bar 126 is secured in any desired position along the rails by a lower cross bar 127 which is tightened to upper cross bar 126 by nuts 128 threaded on screws 129 extending from upper cross bar 126 to sandwich the rails therebetween. In this way, support 125 can be secured in any desired position along the rails. A cushion 130 (FIGS. 18 and 19) may be secured to support 125 as by screws 131 extending through holes 132 (FIG. 15). A seat cushion 134 (FIGS. 18 and 19), with hooks 135 may be placed on the rails with hooks 135 extending under and around upper cross bar 126 as shown in FIG. 18. Slots 136 and 137 in upper cross bar 126 and lower cross bar 127, respectively, provide room to insert hooks 135 into upper cross bar 126. This creates a passenger seat behind the rider's seat on the motorcycle. Seat cushion 134 can also be mounted vertically as shown in FIG. 19 by hooking hooks 135 through holes 138 (FIG. 15) in cross plate 115. This will provide a back rest for the rider and still allow support 125 to secure luggage on the rack. Alternately, support 125 with cushion 130 can be slid along the rails to a position immediately behind the rider's seat 87 and provide a back rest for the rider. If support 125 is moved all the way to the rear of the rails, or to any other desired position, it can help secure luggage.

While several embodiments have been shown with various features in each, it should be understood that various of the features of each embodiment may be used with other embodiments.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of attaching a base for an auxiliary passenger seat, luggage rack, or combination thereof to a rear portion of a motorcycle, comprising the steps of:
   securing mounting plates to opposite sides of the rear portion of a motorcycle so that said mounting plates extend partially along said opposite sides, said mounting plates having securement portions at which the plates are adapted to be secured to a motorcycle and having mounting pins extending therefrom offset from the securement portions;
   providing a base having a plurality of hooks adapted to receive mounting pins therein and at least one latch;
   engaging the hooks of the base to the mounting pins of the mounting plates; and
   engaging at least one latch to prevent the hooks from slipping off the mounting pins.

2. A base for an auxiliary passenger seat, luggage rack, or both for a motorcycle comprising:
   a supporting structure having a plurality of hook members adapted to be removably engaged with mounting pins mounted on the motorcycle;
   a plurality of pins attached to the supporting structure adapted to be inserted in sockets attached to bolts of said motorcycle; and
   at least one latch cooperable between the supporting structure and the motorcycle to prevent the hook members from sliding off of the mounting pins when the at least one latch is secured.

3. The base for a motorcycle of claim 2, further comprising a pad attached to the supporting structure.

4. The base of claim 3, further comprising a seating pad and a luggage rack.

5. The base of claim 3, further comprising seating pad and a backrest.

6. A motorcycle comprising:
   a frame;
   at least two wheels rotatably attached to the frame;
   a steering mechanism by which at least one of the wheels may be steered;
   an internal combustion engine by which at least one of the wheels may be driven;
   a pair of mounting plates;
   securement means securing respective mounting plates to opposite sides of a rear portion of the frame to extend partially along said opposite sides;
   a plurality of mounting pins attached to and extending from the respective mounting plates and offset from the securement means;
   a supporting structure having a plurality of hook members, wherein the hook members are removably engaged upon the mounting pins; and
   latch means to prevent the hook members from slipping off the mounting pins.

7. A motorcycle according to claim 6, wherein the latch means is a screw extending through a mounting plate and the supporting structure to prevent relative movement of the supporting structure and the mounting plate.

8. The base of claim 6, wherein the securement means is at least one bolt normally provided on the motorcycle.

9. An auxiliary passenger seat for attachment to a motorcycle comprising;
   a base for attachment to a motorcycle;
   a support extending from the base and slidably mounted on the base to be positioned a selected distance behind a rider's seat of the motorcycle; and
   a cushion for mounting on the base;
   wherein when the selected distance behind the rider's seat is immediately behind the rider's seat the support provides a backrest for the rider and when the selected distance behind the rider's seat is sufficient to allow mounting of the cushion on the base, the cushion is mounted immediately forwardly of the support, and the support provides a backrest for the passenger seat.

10. An auxiliary passenger seat according to claim 9, wherein the cushion includes hook means for attaching the cushion to the support to secure the cushion to the base.

11. An auxiliary passenger seat according to claim 10, wherein the base includes receiving means for the cushion hook means to position the cushion vertically behind the rider's seat to provide a backrest for the rider.

12. A base for an auxiliary passenger seat, luggage rack, or both for a motorcycle, comprising:
   a pair of mounting plates adapted to be secured to opposite sides of a rear portion of a motorcycle, said plates having securement portions at which the plates are adapted to be secured to the motorcycle;
   a plurality of mounting pins attached to and extending from respective mounting plates and offset from the securement portions;
   a supporting structure having a plurality of hook members adapted to be removably engaged with the mounting pins extending from the mounting plates; and
   latch means to prevent the hook members from slipping off the mounting pins.

13. The base of claim 12, wherein the securement portion of the respective plates include at least one hole adapted to be aligned with a bolt receiving hole normally provided in the motorcycle to which the plate is to be attached.

\* \* \* \* \*